(12) United States Patent  
Lu et al.

(10) Patent No.: US 12,272,985 B2
(45) Date of Patent: Apr. 8, 2025

(54) MANUFACTURING METHOD OF FLEXIBLE CHARGING PAD

(71) Applicant: DEXIN CORPORATION, New Taipei (TW)

(72) Inventors: Ho-Lung Lu, New Taipei (TW); Shih-Wei Pan, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 18/632,469

(22) Filed: Apr. 11, 2024

(65) Prior Publication Data

US 2024/0258821 A1 Aug. 1, 2024

Related U.S. Application Data

(62) Division of application No. 17/166,095, filed on Feb. 3, 2021, now Pat. No. 11,990,787.

(30) Foreign Application Priority Data

Sep. 30, 2020 (TW) .................................. 109133996

(51) Int. Cl.
*H02J 7/02* (2016.01)
*G06F 3/039* (2013.01)
*H01F 27/28* (2006.01)
*H01F 41/04* (2006.01)
*H02J 7/00* (2006.01)
*H02J 50/10* (2016.01)

(52) U.S. Cl.
CPC .............. *H02J 7/02* (2013.01); *G06F 3/0395* (2013.01); *H01F 27/28* (2013.01); *H01F 41/04* (2013.01); *H02J 7/0042* (2013.01); *H02J 50/10* (2016.02)

(58) Field of Classification Search
CPC ...... H01F 41/04; H01F 41/074; H01F 41/125; H01F 38/14; H01F 27/324; H01F 27/2823; H01F 27/28; H02J 7/0042; H02J 7/02; H02J 50/005; H02J 50/10; G06F 3/0395
USPC ........................................... 307/104; 320/108
See application file for complete search history.

(56) References Cited

U.S. PATENT DOCUMENTS

| 2010/0141217 | A1 | 6/2010 | Morris | |
| 2016/0081238 | A1* | 3/2016 | Lee | H02J 7/00 156/60 |
| 2019/0315896 | A1* | 10/2019 | Ohkura | C09D 127/18 |
| 2020/0218369 | A1* | 7/2020 | Chou | H01F 38/14 |

(Continued)

FOREIGN PATENT DOCUMENTS

| CN | 111427466 A | 7/2020 |
| CN | 212723960 U | 3/2021 |

*Primary Examiner* — Kevin J Comber
(74) *Attorney, Agent, or Firm* — Li & Cai Intellectual Property (USA) Office

(57) ABSTRACT

A manufacturing method of a flexible charging pad includes: providing a double-sided tape to form an adhesion layer, one of two isolation papers is attached on the first adhesion surface, and another of the two isolation papers is attached on the second adhesion surface; removing the isolation paper attached on the first adhesion surface, and attaching a conductor on the first adhesion surface; attaching a first pad layer on the first adhesion surface to cover the conductor, the conductor is disposed between the first pad layer and the adhesion layer; disposing an adhesive to cover the conductor and the first pad layer, and to form a molded layer.

7 Claims, 7 Drawing Sheets

(56) References Cited

U.S. PATENT DOCUMENTS

2020/0220374 A1   7/2020  Chou
2020/0225774 A1*  7/2020  Chou .................... H02J 50/10

* cited by examiner

MANUFACTURING METHOD OF FLEXIBLE CHARGING PAD

CROSS-REFERENCE TO RELATED PATENT APPLICATION

This application is a divisional application of the U.S. application Ser. No. 17/166,095, filed on Feb. 3, 2021 and entitled "FLEXIBLE CHARGING PAD AND MANUFACTURING METHOD THEREOF", now pending, which claims the benefit of priorities to Taiwan Patent Application No. 109133996 filed on Sep. 30, 2020, the entire disclosures of which are incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a manufacturing method, and more particularly to a manufacturing method of a flexible charging pad.

BACKGROUND OF THE DISCLOSURE

With the development of various electronic products, related peripheral devices for charging these electronic products are constantly modified and improved. A typical example is a wireless charging mouse pad.

Various types of wireless charging mouse pads are commercially available on the market. However, manufacturing processes and final products of the conventional wireless charging mouse pad are still in need of improvement. For example, during the manufacturing processes of the wireless charging mouse pad, it is hard to fix a coil for wireless transmission in place inside the mouse pad. In addition, when the mouse pad is used by a user, the tactile sensation provided by the mouse pad can be negatively affected by the shape of the coil bulging out from the mouse pad.

Therefore, how the structural design of the conventional wireless charging mouse pad can be improved to overcome the abovementioned inadequacies has become one of the important issues to be solved in the relevant industry.

SUMMARY OF THE DISCLOSURE

In response to the above-referenced technical inadequacies, a manufacturing method of a flexible charging pad is provided in the present disclosure.

In response to the above-referenced technical inadequacies, a manufacturing method of a flexible charging pad is provided in the present disclosure. The manufacturing method includes: providing a double-sided tape to form an adhesion layer, in which the adhesion layer has a first adhesion surface and a second adhesion surface that are respectively located at two opposite sides of the adhesion layer, one of two isolation papers is attached on the first adhesion surface, and another of the two isolation papers is attached on the second adhesion surface; removing the isolation paper attached on the first adhesion surface, and attaching a conductor on the first adhesion surface; attaching a first pad layer on the first adhesion surface to cover the conductor, in which the conductor is disposed between the first pad layer and the adhesion layer; and disposing an adhesive to cover the conductor and the first pad layer, and to form a molded layer through an in-mold forming process.

Therefore, by virtue of "providing a double-sided tape to form an adhesion layer, in which the adhesion layer has a first adhesion surface and a second adhesion surface that are respectively located at two opposite sides of the adhesion layer, one of two isolation papers is attached on the first adhesion surface, and another of the two isolation papers is attached on the second adhesion surface," "removing the isolation paper attached on the first adhesion surface, and attaching a conductor on the first adhesion surface," "attaching a first pad layer on the first adhesion surface to cover the conductor, in which the conductor is disposed between the first pad layer and the adhesion layer," and "disposing an adhesive to cover the conductor and the first pad layer, and to form a molded layer through an in-mold forming process," the manufacturing method of the flexible charging pad can be optimized.

In addition, during the in-mold forming process in which the conductor (metal wire) is stacked in the mold, a temperature for shaping the adhesive is approximately 230° C. However, such a high temperature causes an external cladding isolation layer of the metal wire to melt, which results in poor characteristics of the metal wire and negatively affects functions of the metal wire, thereby increasing the defect rate of the final product. In the present disclosure, a heat resistance double-sided tape and a cladded conductive wire with a heat-resistant temperature of 240° C. or higher are used in the flexible charging pad to overcome the problem of poor stacking of the conductor due to the high temperature during the in-mold process.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIGS. 4-1 to 4-7 are schematic views respectively showing different manufacturing processes of the flexible charging pad according to one embodiment of the present disclosure.

DETAILED DESCRIPTION OF THE EXEMPLARY EMBODIMENTS

Figure 1:
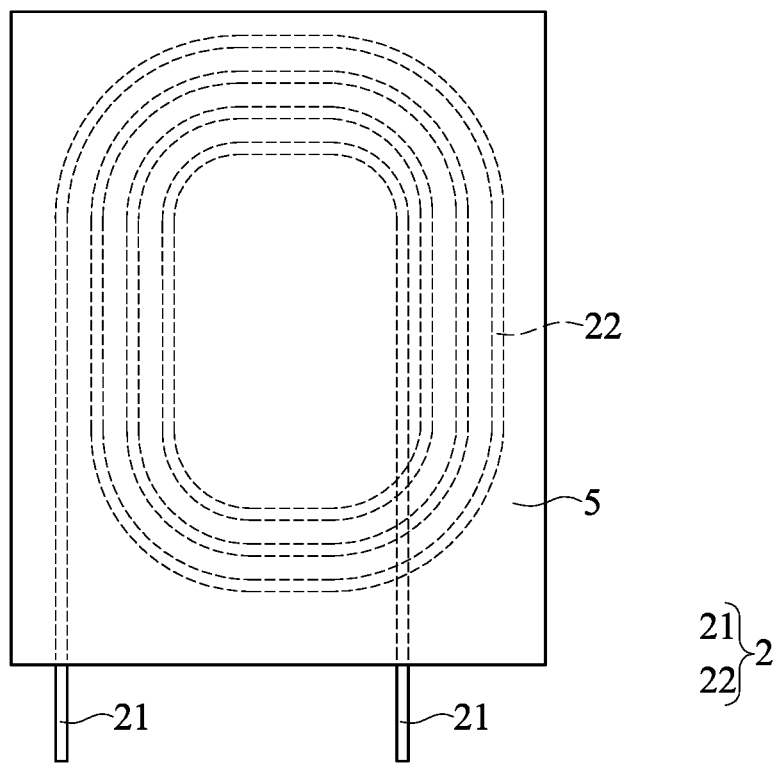
FIG. 1 is a schematic top view of a flexible charging pad according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiment

Figure 2:
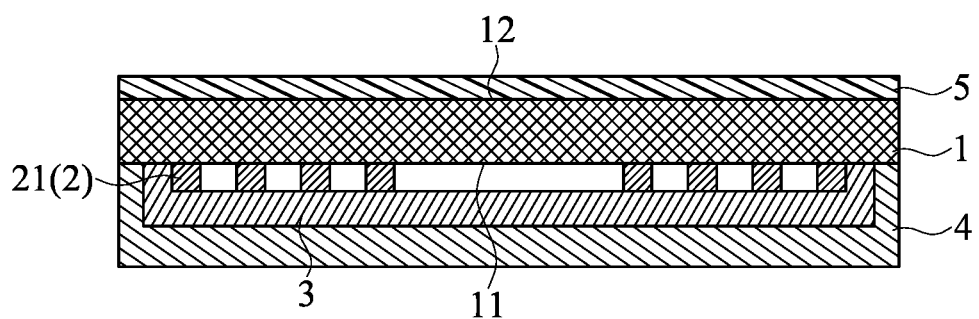
FIG. 2 is a schematic sectional view of the flexible charging pad according to one embodiment of the present disclosure.

Referring is made to FIG. 1 and FIG. 2. FIG. 1 is a schematic top view of a flexible charging pad according to one embodiment of the present disclosure FIG. 2 is a schematic sectional view of the flexible charging pad according to one embodiment of the present disclosure. A flexible charging pad is provided in the present disclosure. The flexible charging pad includes an adhesion layer 1, a conductor 2, a first pad layer 3, and a molded layer 4. The adhesion layer 1 has a first adhesion surface 11 and a second adhesion surface 12 respectively located at two opposite sides of the adhesion layer 1. For example, the adhesion layer 1 is a double-sided tape. Moreover, the adhesion layer 1 is a heat resistance double-sided tape. Two isolation papers are attached on the first adhesion surface 11 and the second adhesion surface 12, respectively. However, the present disclosure is not limited to the examples provided herein.

The two isolation papers attached on the first adhesion surface 11 and the second adhesion surface 12 are removed, and the first adhesion surface 11 and the second adhesion surface 12 are exposed. The conductor 2 is attached on the first adhesion surface 11. In the present embodiment, the conductor 2 is a metal coil formed by winding a metal wire. It should be noted that the winding method, the turns, and the winding shape of the metal wire are not limited in the present disclosure. More specifically, the conductor 2 includes a coil body 21 and two connection parts 22 respectively located at two ends of the coil body 21. When the conductor 2 is attached on the first adhesion surface 11, the coil body 21 is attached on the first adhesion surface 11 and the connection parts 22 are not in contact with the first adhesion surface 11. The connection parts 22 can be used to connect to an external power device. However, it should be noted that the lengths of the connection parts 22 and the distance between the two connection parts 22 are not limited in the present disclosure.

The first pad layer 3 is attached on the first adhesion surface 11 and covers the conductor 2. For example, the first pad layer 3 may be made of fabric. The fabric may be non-woven fabric or fiber fabric. However, the present disclosure is not limited to the examples provided herein. More specifically, since the first pad layer 3 covers the conductor 2, the conductor 2 is disposed between the first pad layer 3 and the adhesion layer 1.

The molded layer 4 covers the conductor 2 and the first pad layer 3. The molded layer 4 is, for example, made of silicone. However, the present disclosure is not limited to the examples provided herein. During the molding process of the molded layer 4, an adhesive is used to cover the conductor 2 and the first pad layer 3, and the adhesive may be made of silicone. After that, an in-mold forming process is performed by using a forming die (not shown) to shape the adhesive so as to form the molded layer 4.

It is worth mentioning that during the in-mold forming process that the coil body 21 is folded in the forming die, the temperature for shaping the adhesive (silicone) is approximately 230° C. However, such a high temperature causes an external cladding isolation layer of the coil body 21, which results in poor characteristics of the coil body 21 and negatively affects functions of the coil body 21, thereby increasing the defect rate of the final product. Therefore, the conductor 2 may include a cladded conductive wire with a heat-resistant temperature of 240° C. or higher. That is to say, the conductor 2 is a metal coil formed by winding a metal wire, and the metal wire is a cladded conductive wire with a heat-resistant temperature of 240° C. or higher. Therefore, the problem of poor stacking of the coil body 21 due to the high temperature during the in-mold process can be solved by using a heat resistance double-sided tape and a cladded conductive wire with a heat-resistant temperature of 240° C. or higher.

In addition, the flexible charging pad Z may further include a second pad layer 5. The second pad layer 5 is attached on the second adhesion surface 12. The second pad layer 5 of the flexible charging pad Z has a surface for placing a mouse that may be held by a user. For example, the second pad layer 5 is made of fabric. The fabric may be non-woven fabric or fiber fabric. However, the present disclosure is not limited to the examples provided herein.

Furthermore, since the coil body 21 is attached on the first adhesion surface 11, a deformation of the coil body 21 formed by winding due to the first pad layer 3 and the molded layer 4 being stacked on the coil body 21 can be prevented. In other words, the adhesion layer 1 can be used to fix the coil body 21 in place to prevent the deformation of the coil body 21.

Furthermore, the first pad layer 3 is attached on the first adhesion surface 11 and covers the conductor 2 through a bridging agent (not shown). As mentioned previously, the molded layer 4 is formed by performing an in-mold forming process with silicone. Even though molded layer 4 has been formed, the interior thereof is still not cured and has ductility. Therefore, when a user holds a mouse and applies pressure on the second pad layer 5 of the flexible charging pad Z of the present disclosure, the coil body 21 may sink downward from pressure. In other words, the coil body 21 would not cause the second pad layer 5 to bulge, and a surface of the second pad layer 5 can remain even. Accordingly, when the user moves the mouse, the user would not be inconvenienced by the interference of the bulge, which negatively affects the tactile sensation provided by the second pad layer 5 due to the coil body 21.

Referring is made to FIGS. 3 and 4-1 to 4-7. A manufacturing method of a flexible charging pad is provided in the present disclosure. The method includes at least following steps:

Step S100: providing a double-sided tape A to form an adhesion layer 1, in which the adhesion layer 1 has a first adhesion surface 11 and a second adhesion surface 12 that are respectively located at two opposite sides of the adhesion layer 1, one of two isolation papers 10 is attached on the first adhesion surface 11, and another of the two isolation papers 10 is attached on the second adhesion surface 12.

Figures 1, 4:
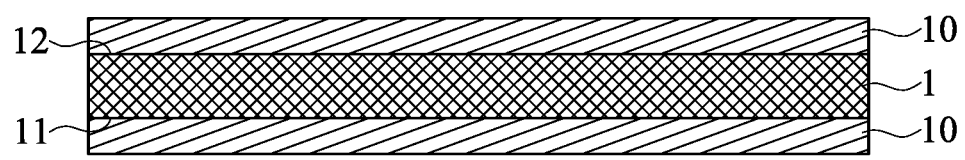
Figures 2, 4:
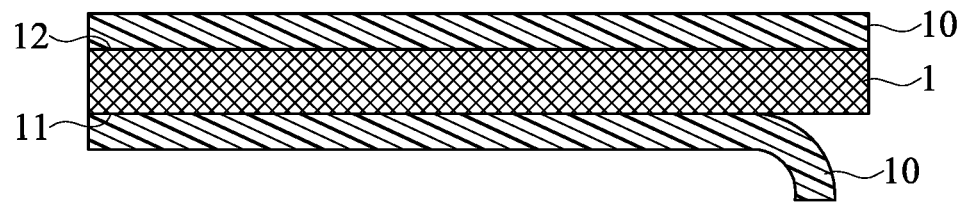
Figures 3, 4:
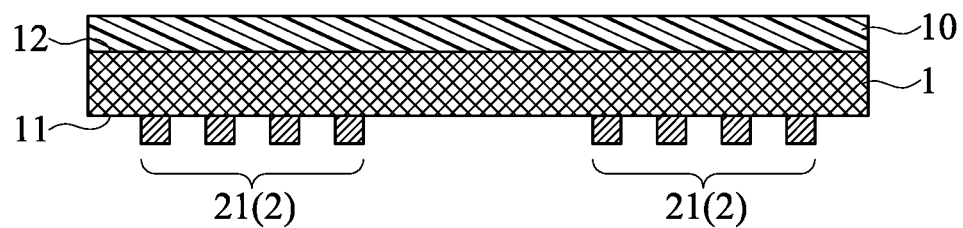
Figure 4:
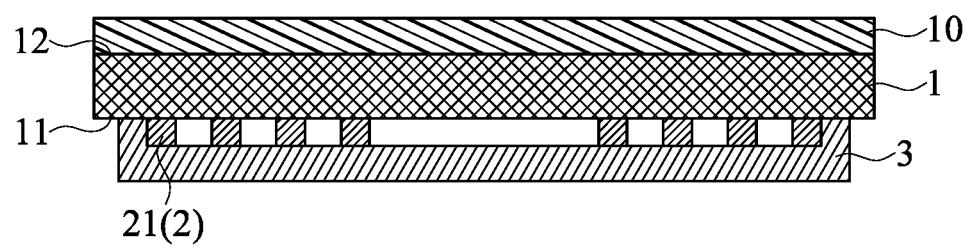

More specifically, referring to FIG. 4-1, the double-sided tape A includes one layer of the adhesion layer 1 and two layers of isolation papers 10. Two isolation papers 10 are attached on the two opposite sides of the adhesion layer 1 through the first adhesion surface 11 and the second adhesion surface 12 of the adhesion layer 1, respectively.

Step S102: removing the isolation paper 10 attached on the first adhesion surface 11, and attaching a conductor 2 on the first adhesion surface 11.

Figure 3:
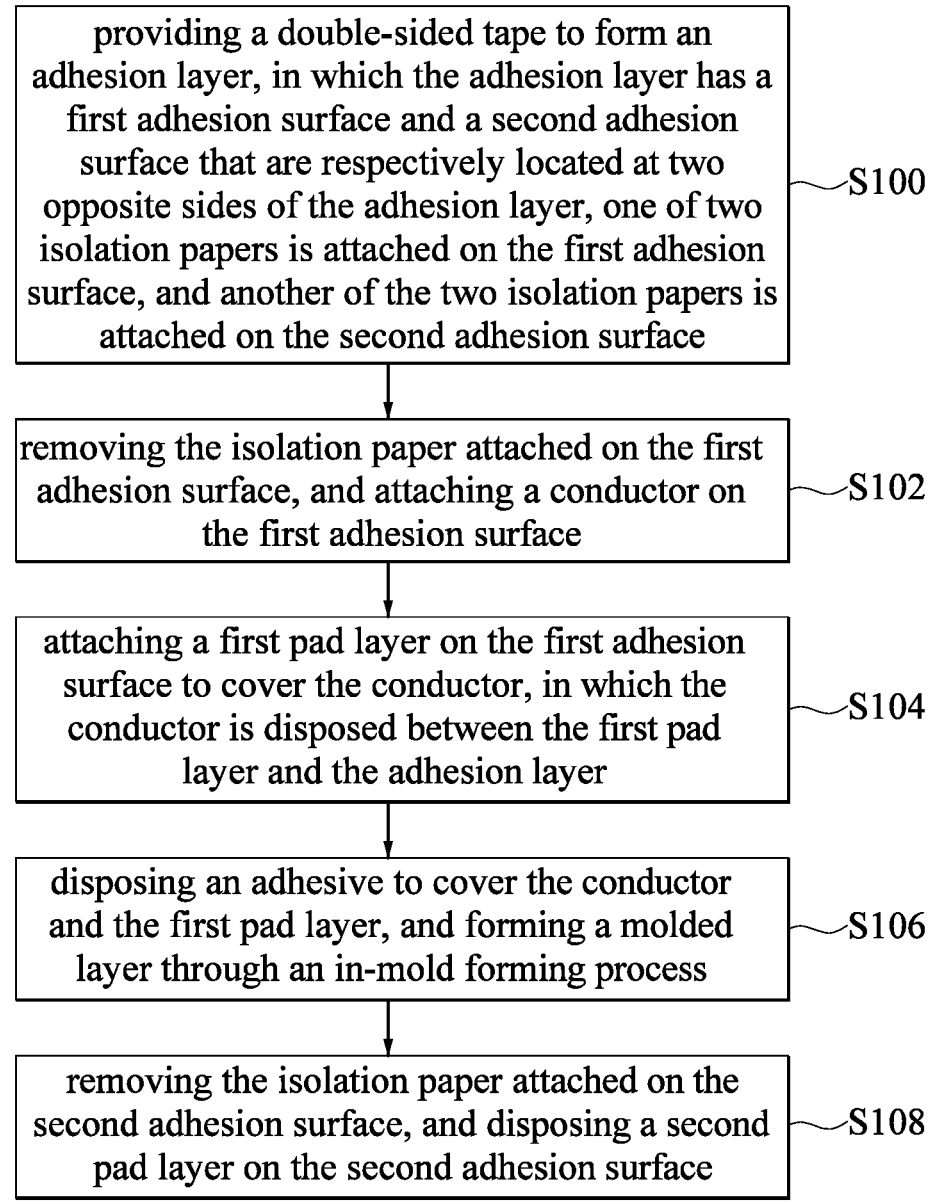
FIG. 3 is a flowchart of a manufacturing method of a flexible charging pad according to one embodiment of the present disclosure.

More specifically, referring is made to FIGS. 4-2 and FIG. 4-3, the isolation paper 10 attached on the first adhesion surface 11 is removed and the first adhesion surface 11 is exposed. Next, the coil body 21 of the conductor 2 is attached on the first adhesion surface 11 such that the shape of the coil body 21 is fixed.

Step S104: attaching a first pad layer 3 on the first adhesion surface 11 to cover the conductor 2, in which the conductor 2 is disposed between the first pad layer 3 and the adhesion layer 1.

More specifically, referring is made to FIG. 4-4, the first pad layer 3 is attached on the first adhesion surface 11 and covers the coil body 21 of the conductor 2. However, the connection parts 22 of the conductor 2 are not covered by the first pad layer 3.

Step S106: disposing an adhesive 40 to cover the conductor 2 and the first pad layer 3, and forming a molded layer 4 through an in-mold forming process.

Figures 4, 5:
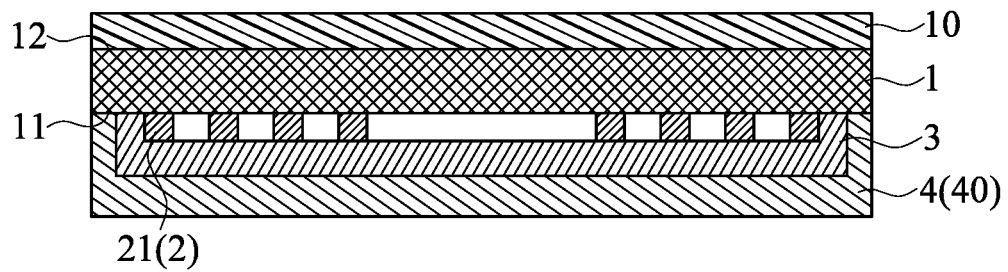
Figures 4, 5, 6:
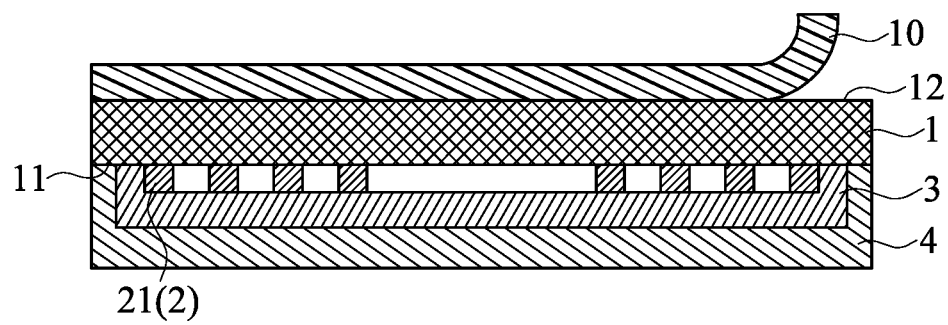
Figures 4, 5, 6, 7:
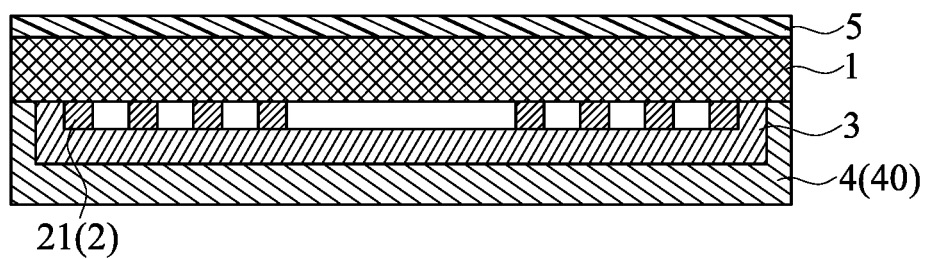

More specifically, referring is made to FIG. 4-5, the adhesive 40 covers the coil body 21 of the conductor 2 and the first pad layer 3. Next, a forming die (not shown) is used to shape an adhesive 40 during an in-mold forming process to form the molded layer 4. It should be noted that the connection parts 22 of the conductor 2 are not covered by the adhesive 40 and exposed out of the molded layer 4.

Step S108: removing the isolation paper 10 attached on the second adhesion surface 12, and disposing a second pad layer 5 on the second adhesion surface 12.

More specifically, referring is made to FIGS. 4-6 and FIG. 4-7, after the molded layer 4 is formed, the isolation paper 10 attached on the second adhesion surface 12 is removed, and the second pad layer 5 is attached on the second adhesion surface 12 to finish the fabrication of the flexible charging pad Z.

Beneficial Effects of the Embodiment

In conclusion, in the manufacturing method of the flexible charging pad provided in the present disclosure, by virtue of "providing a double-sided tape A to form an adhesion layer 1, in which the adhesion layer 1 has a first adhesion surface 11 and a second adhesion surface 12 that are respectively located at two opposite sides of the adhesion layer 1, one of two isolation papers 10 is attached on the first adhesion surface 11, and another of the two isolation papers 10 is attached on the second adhesion surface 12," "removing the isolation paper 10 attached on the first adhesion surface 11, and attaching a conductor 2 on the first adhesion surface 11," "attaching a first pad layer 3 on the first adhesion surface 11 to cover the conductor 2, in which the conductor 2 is disposed between the first pad layer and the adhesion layer 2," and "disposing an adhesive 40 to cover the conductor 2 and the first pad layer 3, and to form a molded layer 4 through an in-mold forming process," the manufacturing method of the flexible charging pad Z can be optimized.

Furthermore, since the coil body 21 is attached on the first adhesion surface 11, the deformation of the coil body 21 formed by winding due to the first pad layer 3 and the molded layer 4 being stacked on the coil body 21 can be prevented. Therefore, the manufacturing method of the flexible charging pad Z is improved.

Furthermore, the first pad layer 3 is attached on the first adhesion surface 11 and covers the conductor 2 through a bridging agent (not shown). As mentioned above, the molded layer 4 is mainly formed by performing an in-mold forming process with silicone. Even though the molded layer 4 is shaped, the interior thereof is not cured and still has ductility. Therefore, when a user holds a mouse and applies pressure on the second pad layer 5 of the flexible charging pad Z of the present disclosure, the coil body 21 may be pressed and sink downward. In other words, the coil body 21 would not cause the second pad layer 5 to bulge, and a surface of the second pad layer 5 can remain even. Accordingly, when the user moves the mouse, the user would not be inconvenienced by the interference of the bulge, which negatively affects the tactile sensation provided by the second pad layer 5 due to the coil body 21. Therefore, the structure of the flexible charging pad is improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A manufacturing method of a flexible charging pad, comprising:
   providing a double-sided tape to form an adhesion layer, wherein the adhesion layer has a first adhesion surface and a second adhesion surface that are respectively located at two opposite sides of the adhesion layer, one of two isolation papers is attached on the first adhesion surface, and another of the two isolation papers is attached on the second adhesion surface;
   removing the isolation paper attached on the first adhesion surface, and attaching a conductor on the first adhesion surface;
   attaching a first pad layer on the first adhesion surface to cover the conductor, wherein the conductor is disposed between the first pad layer and the adhesion layer; and
   disposing an adhesive to cover the conductor and the first pad layer, and to form a molded layer through an in-mold forming process, and wherein the conductor and the molded layer are separated by the first pad layer and not in contact with each other.

2. The manufacturing method according to claim 1, further comprising: removing the isolation paper attached on the second adhesion surface, and disposing a second pad layer on the second adhesion surface.

3. The manufacturing method according to claim 2, wherein the second pad layer is made of fabric.

4. The manufacturing method according to claim 1, wherein the conductor is a metal coil formed by winding a metal wire.

5. The manufacturing method according to claim 1, wherein the conductor includes a cladded conductive wire with a heat-resistant temperature of 240° C. or higher.

6. The manufacturing method according to claim 1, wherein the first pad layer is made of fabric.

7. The manufacturing method according to claim 1, wherein the molded layer is made of silicone.

* * * * *